(12) United States Patent
Ikeda et al.

(10) Patent No.: US 11,157,063 B2
(45) Date of Patent: Oct. 26, 2021

(54) CONTROL SYSTEM

(71) Applicant: FUJIFILM BUSINESS INNOVATION CORP., Tokyo (JP)

(72) Inventors: Shinho Ikeda, Kanagawa (JP); Asahito Shioyasu, Kanagawa (JP); Tomoki Tanihata, Kanagawa (JP); Hisashi Noda, Kanagawa (JP); Kenta Nomura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 43 days.

(21) Appl. No.: 16/688,056

(22) Filed: Nov. 19, 2019

(65) Prior Publication Data

US 2020/0319689 A1 Oct. 8, 2020

(30) Foreign Application Priority Data

Apr. 2, 2019 (JP) .............................. JP2019-070645

(51) Int. Cl.
*G06F 1/32* (2019.01)
*G06F 1/3234* (2019.01)
*G06F 1/3293* (2019.01)

(52) U.S. Cl.
CPC ............ *G06F 1/325* (2013.01); *G06F 1/3293* (2013.01)

(58) Field of Classification Search
CPC ........................................................ G06F 1/325
USPC ........................................................ 713/320
See application file for complete search history.

(56) References Cited

U.S. PATENT DOCUMENTS

| | | | |
|---|---|---|---|
| 2014/0157032 A1* | 6/2014 | Yokoyama | H04N 1/00928 713/323 |
| 2017/0195508 A1* | 7/2017 | Park | H04N 1/4406 |
| 2018/0096236 A1* | 4/2018 | Bermundo | G06K 15/007 |
| 2018/0253318 A1 | 9/2018 | Hara | |

FOREIGN PATENT DOCUMENTS

JP 2018-144331 A 9/2018

* cited by examiner

*Primary Examiner* — Volvick Derose
(74) *Attorney, Agent, or Firm* — Oliff PLC

(57) ABSTRACT

A control system includes: a controller that controls a control unit of a control device, the control unit controlling multiple function units; and a restorer that is capable of receiving a first instruction for restoration from an energy-saving mode from a user who is in a proximate location near the controller, and a second instruction for the restoration from a user who is in a location further away than the proximate location, the restorer altering a timing for restoration of the control unit between a case where there the first instruction is received and a case where the second instruction is received.

14 Claims, 6 Drawing Sheets

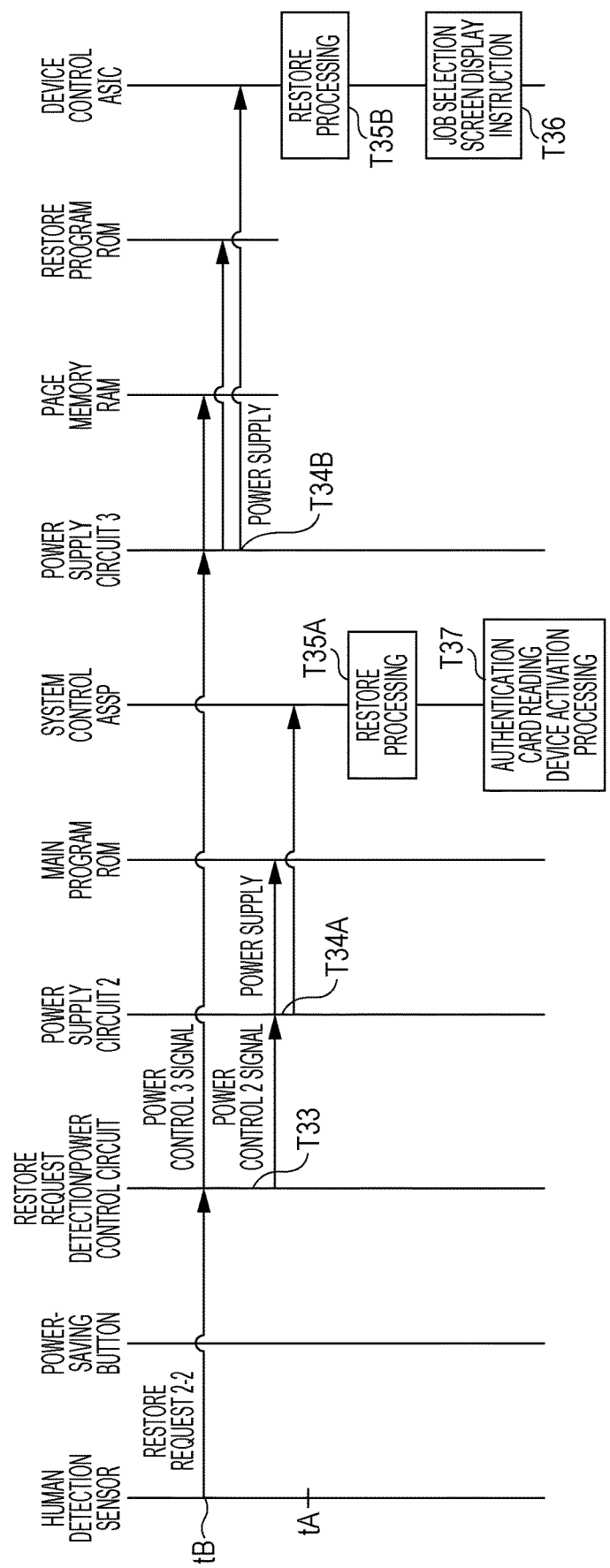

CONTROL SYSTEM

CROSS-REFERENCE TO RELATED APPLICATIONS

This application is based on and claims priority under 35 USC 119 from Japanese Patent Application No. 2019-070645 filed Apr. 2, 2019.

BACKGROUND

(i) Technical Field

The present disclosure relates to a control system.

(ii) Related Art

Japanese Unexamined Patent Application Publication No. 2018-144331 discloses an information processing device provided with a main substrate and a sub-substrate communicably connected to the main substrate. The main substrate has: transfer means for transferring an operation program for operating the sub-substrate to temporary storage means of the sub-substrate; and instruction means for instructing the sub-substrate to start executing the operation program. The sub-substrate has activation means for, upon receiving the execution start instruction, executing activation processing for the sub-substrate according to the operation program stored in the temporary storage means by the transfer means. The transfer means transfers cause information indicating a cause for the device itself having been activated, to the temporary storage means before the execution start instruction for the operation program is issued. The activation means executes the activation processing in accordance with the cause information.

SUMMARY

Aspects of non-limiting embodiments of the present disclosure relate to a control system with which a restore wait time experienced by a user can be shortened to a greater degree than with related art.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a control system including: a controller that controls a control unit of a control device, the control unit controlling multiple function units; and a restorer that is capable of receiving a first instruction for restoration from an energy-saving mode from a user who is in a proximate location near the controller, and a second instruction for the restoration from a user who is in a location further away than the proximate location, the restorer altering a timing for restoration of the control unit between a case where there the first instruction is received and a case where the second instruction is received.

BRIEF DESCRIPTION OF THE DRAWINGS

Exemplary embodiments of the present disclosure will be described in detail based on the following figures, wherein:

FIG. 6 is a timing chart for restore processing in a case where a restore request 2-2 signal is output to the restore request detection/power control circuit.

DETAILED DESCRIPTION

Hereinafter, exemplary modes for carrying out the present disclosure will be described in detail with reference to the drawings.

First Exemplary Embodiment

Figure 1:
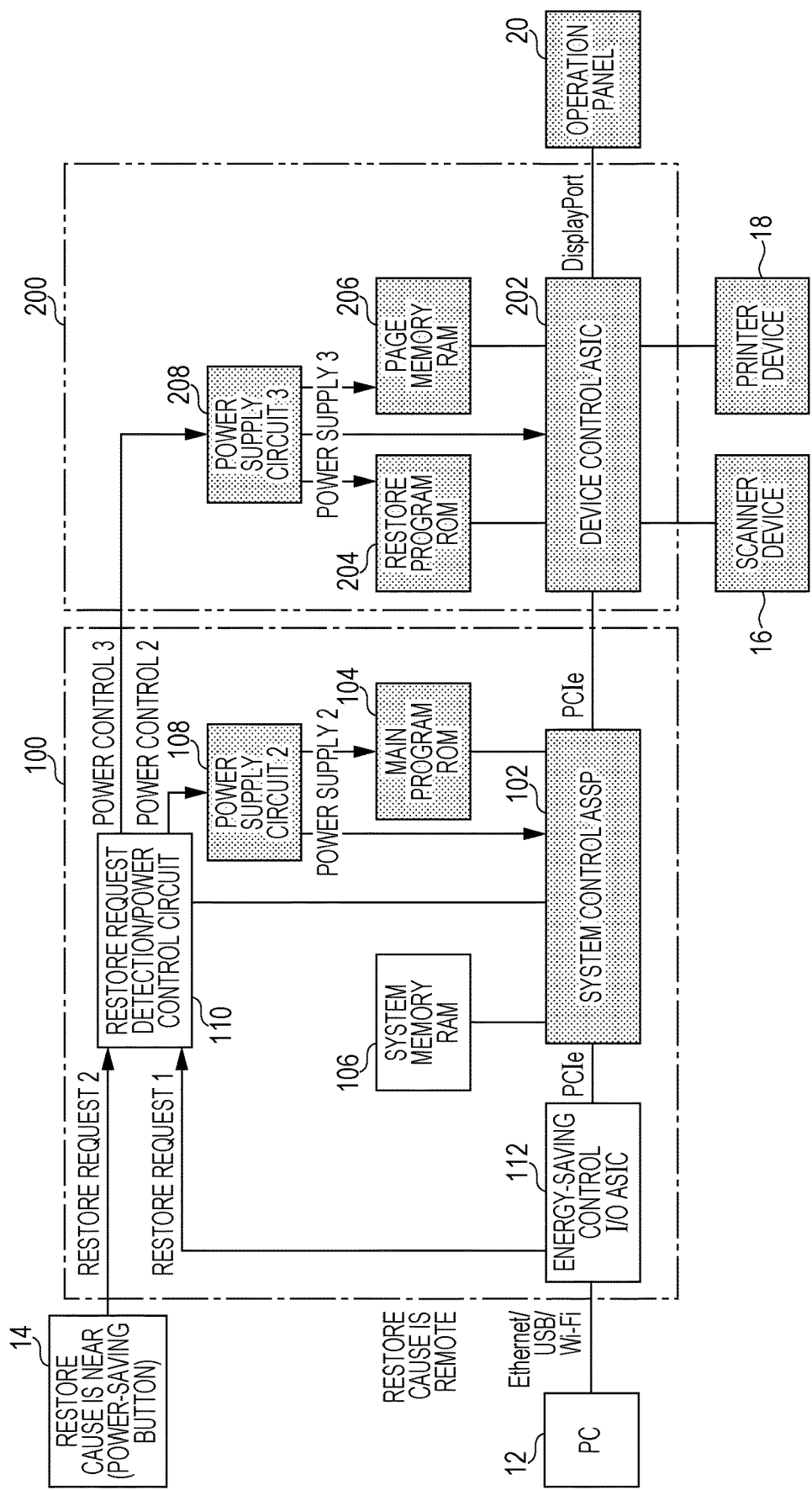
FIG. 1 is a block diagram of a multifunction printer of exemplary embodiment 1.

FIG. 1 depicts a block diagram of a multifunction printer (hereinafter referred to as an "MFP") of exemplary embodiment 1. As depicted in FIG. 1, the MFP is provided with a control system 100 and a control device 200. The control device 200 is connected to multiple functions such as a scanner device 16, a printer device 18, and an operation panel 20. The control device 200 is provided with a device control ASIC (application-specific integrated circuit) 202 that controls the scanner device 16, the printer device 18, and the operation panel 20. The control device 200 is provided with a restore program ROM (read only memory) 204 that stores a restore program executed by the device control ASIC 202, and a page memory RAM (random access memory) 206 that has a memory region for the device control ASIC 202. The control device 200 is provided with a power supply circuit 3_208 that supplies power to the device control ASIC 202, the restore program ROM 204, and the page memory RAM 206.

The control system 100 is provided with a system control ASSP (application-specific standard product) 102 that is connected to the device control ASIC 202 via a PCIe (PCI Express) unit and controls the device control ASIC 202. The control system 100 is provided with a system memory RAM 106 that has a memory region for the device control ASIC 202, and a main program ROM 104 that stores a program for the system control ASSP 102 and a program for the device control ASIC 202. The control system 100 is provided with a power supply circuit 2_108 that supplies power to the system control ASSP 102, the system memory RAM 106, and the main program ROM 104. The control device 200 is provided with a restore request detection/power control circuit 110 that is connected to the system control ASSP 102, the power supply circuit 3_208, and the power supply circuit 2_108. The restore request detection/power control circuit 110 has a PC 12 connected thereto via an energy-saving control I/O ASIC 112, and has a power-saving button 14 connected thereto. The energy-saving control I/O ASIC 112 and the system control ASSP 102 are connected by a PCIe unit.

Next, the action of the first exemplary embodiment will be described.

The MFP is in a power-saving mode. Specifically, power is supplied to the system control ASSP 102, the scanner device 16, the printer device 18, the operation panel 20, and the device control ASIC 202.

Requests for restoration from the power-saving mode include a first instruction being issued by the power-saving button 14 being operated by a user who is in a location near the MFP (a proximate location), and a second instruction being issued via the PC 12 by a user who is in a location further away than the near location (a remote location). It should be noted that the second instruction is issued by the PC 12 transmitting a print job or a setting information transmission request job to the MFP.

When a user operates the power-saving button 14, a restore request 2 signal representing a request for restoration from the power-saving mode is output to the restore request detection/power control circuit 110.

When a print job or setting information transmission request job for the MFP is transmitted to the MFP by the PC 12, the print job or setting information transmission request job is received by the energy-saving control I/O ASIC 112, and a restore request 1 signal is output to the restore request detection/power control circuit 110 from the energy-saving control I/O ASIC 112.

The following different restore processing is carried out in a case where the restore request 1 signal is output, and in a case where the restore request 2 signal is output, to the restore request detection/power control circuit 110.

Figure 2:
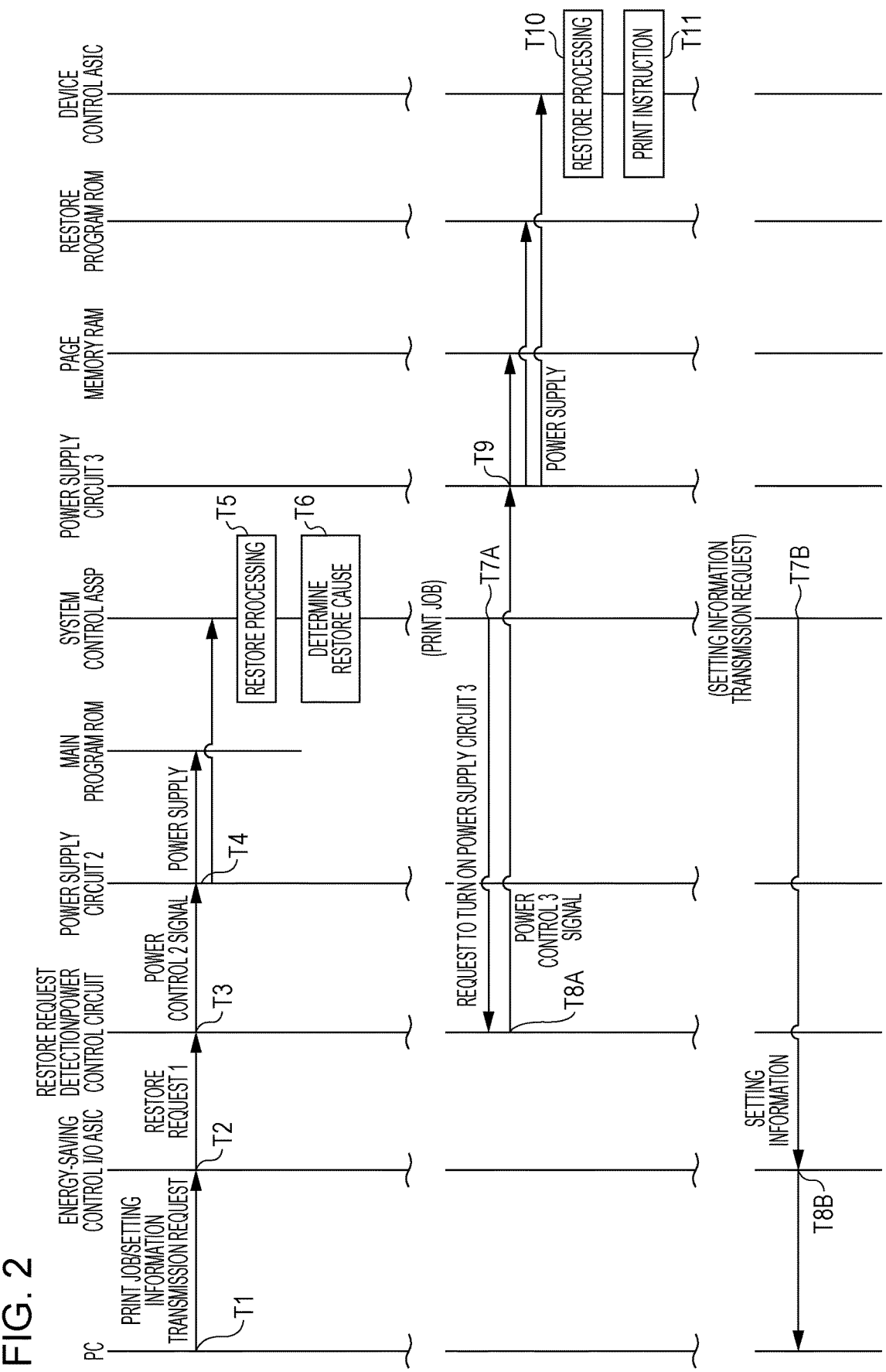
FIG. 2 is a timing chart for restore processing in a case where a restore request 1 signal is output to a restore request detection/power control circuit.

First, restore processing for the case where a restore request 1 signal is output to the restore request detection/power control circuit 110 will be described with reference to FIG. 2.

A print job or setting information transmission request job is transmitted from the PC 12 (time T1) via a network (for example, Ethernet (registered trademark), USB, or Wi-Fi). The energy-saving control I/O ASIC 112 outputs a restore request 1 signal to the restore request detection/power control circuit 110 (time T2). The restore request detection/power control circuit 110 detects the restore request 1 signal. The restore request detection/power control circuit 110, upon detecting the restore request 1 signal, outputs a power control 2 signal to the power supply circuit 2_108 (time T3). The power supply circuit 2_108 supplies power to the main program ROM 104 and the system control ASSP 102 (time T4). The system control ASSP 102, having received a supply of power, loads a main program from the main program ROM 104 into the system memory RAM 106, and executes restore processing in accordance with the main program (time T5).

The system control ASSP 102 issues a query to the restore request detection/power control circuit 110 to thereby determine whether or not the job received by the energy-saving control I/O ASIC 112 is a job for which it is necessary to restore the device control ASIC 202 (time T6).

In a case where the job transmitted from the PC 12 is a print job, it is determined that it is necessary to restore the device control ASIC 202. In a case where it is determined that the job transmitted from the PC 12 is a setting information transmission request job, it is determined that it is not necessary to restore the device control ASIC 202.

In a case where it is determined that the job transmitted from the PC 12 is a print job, the system control ASSP 102 outputs a power control 3 signal to the restore request detection/power control circuit 110 and thereby requests the power supply circuit 3_208 to be turned on (time T7A). The restore request detection/power control circuit 110, having received the request for the power supply circuit 3_208 to be turned on, outputs the power control 3 signal to the power supply circuit 3_208 (time T8A). The power supply circuit 3_208 supplies power to the page memory RAM 206, the restore program ROM 204, and the device control ASIC 202 (time T9). The device control ASIC 202, having received a supply of power, loads a restore program from the restore program ROM 204 into the page memory RAM 206, and executes restore processing in accordance with the restore program (time T10). In this case, the device control ASIC 202 together with the system control ASSP 102 initializes a PCIe unit and carries out link training for communication to be possible therebetween.

In addition, the device control ASIC 202 supplies power to the printer device 18 by way of a power supply circuit that is not depicted, and instructs the print job to be executed (time T11).

In this way, in a case where the job transmitted from the PC 12 is a print job, the device control ASIC 202 is restored from a power-saving mode in order for the printer device 18 to be driven.

In contrast, in a case where it is determined that the job transmitted from the PC 12 is a setting information transmission request job, setting information stored in the system memory RAM 106, for example, at the system control ASSP 102 side is transmitted to the PC 12 via the energy-saving control I/O ASIC 112 (time T7B and time T8B). In this case, it is not necessary for the device control ASIC 202 side to be restored. Thus, the system control ASSP 102 does not request the restore request detection/power control circuit 110 for the power supply circuit 3_208 to be turned on.

In this way, in a case where it is determined that the job transmitted from the PC 12 is a setting information transmission request job, power is not supplied to the device control ASIC 202 or the printer device 18. Power consumption is thereby reduced to a greater degree than with related art.

Next, restore processing for the case where a restore request 2 signal is output to the restore request detection/power control circuit 110 will be described with reference to FIG. 3.

A user who is in a location near the MFP (a proximate location) operates the power-saving button 14. The power-saving button 14 outputs a restore request 2 signal to the restore request detection/power control circuit 110 (time T22). The restore request detection/power control circuit 110, to which the restore request 2 signal has been output, outputs a power control 3 signal to the power supply circuit 3_208 and outputs a power control 2 signal to the power supply circuit 2_108 without waiting for a determination or instruction according to the system control ASSP 102 (time T23).

The power supply circuit 2_108 supplies power to the main program ROM 104 and the system control ASSP 102 (time T24A). The system control ASSP 102, having received a supply of power, loads the main program from the main program ROM 104 into the system memory RAM 106, and executes restore processing in accordance with the main program (time T25A).

The power supply circuit 3_208 supplies power to the page memory RAM 206, the restore program ROM 204, and the device control ASIC 202 (time T24B). The device control ASIC 202, having received a supply of power, loads the restore program from the restore program ROM 204 into the page memory RAM 206, and executes restore processing in accordance with the restore program (time T25B).

Due to the restore processing performed by the system control ASSP 102 (time T25A) and the restore processing performed by the device control ASIC 202 (time T25B), the PCIe unit between the system control ASSP 102 and the device control ASIC 202 is initialized, and link training is carried out for communication to be possible therebetween.

In addition, the device control ASIC 202 supplies power to the operation panel 20 by way of a power supply circuit that is not depicted, displays a job selection screen on the operation panel 20 (time T26), and prompts the user to select a job. For example, in a case where the user selects a copy job, power is supplied to the scanner device 16 and the printer device 18 from a power supply circuit that is not depicted, and a document is scanned and printed.

In a case where the restore request 1 signal for a print job is output, the system control ASSP 102 is restored, and thereafter the device control ASIC 202 is restored. In contrast, in a case where the restore request 2 signal is output, the system control ASSP 102 and the device control ASIC 202 are restored at the same time. This is because, although it is necessary for the device control ASIC 202 to be restored in either case, in the case where the restore request 2 signal is output, the user is already near the MFP and therefore feels that the restore wait time is long if the system control ASSP 102 and the device control ASIC 202 are not restored at the same time. In contrast, in the case where the restore request 1 signal for a print job is output, the user moves toward the MFP from a remote location, and therefore time for the movement is necessary and the user does not feel that the restore wait time is long even if the system control ASSP 102 is restored and thereafter the device control ASIC 202 is restored.

In the first exemplary embodiment, the timing of the restore time for each function of the MFP is altered in the case where there is a restore instruction from a proximate location and in the case where there is a restore instruction from a remote location.

In a case where the job transmitted from the PC 12 is a print job, the system control ASSP 102 determines that it is necessary for the device control ASIC 202 to be restored, and supplies power to the device control ASIC 202 which is thereby restored. In contrast, in a case where the job transmitted from the PC 12 is a setting information transmission request job, the system control ASSP 102 determines that it is not necessary for the device control ASIC 202 to be restored, and does not supply power to the device control ASIC 202. Thus, the device control ASIC 202 remains in the power-saving mode.

In the first exemplary embodiment, if there is a restore request, power is supplied to the necessary parts according to the restore cause rather than all parts being uniformly restored, and therefore there is no increase in power, and power consumption is further reduced.

In the first exemplary embodiment, the timing of the restore time for each function of the MFP is altered in the case where there is a restore instruction from a proximate location and in the case where there is a restore instruction from a remote location, and therefore the restore wait time experienced by a user is shortened without sacrificing quietness.

Second Exemplary Embodiment

Next, a second exemplary embodiment will be described. The configuration of an MFP in the second exemplary embodiment has parts that are similar to the MFP in the first exemplary embodiment, and therefore the similar parts will be denoted by the same reference numbers and descriptions thereof will be omitted, and parts that are different will be mainly described.

Figure 4:
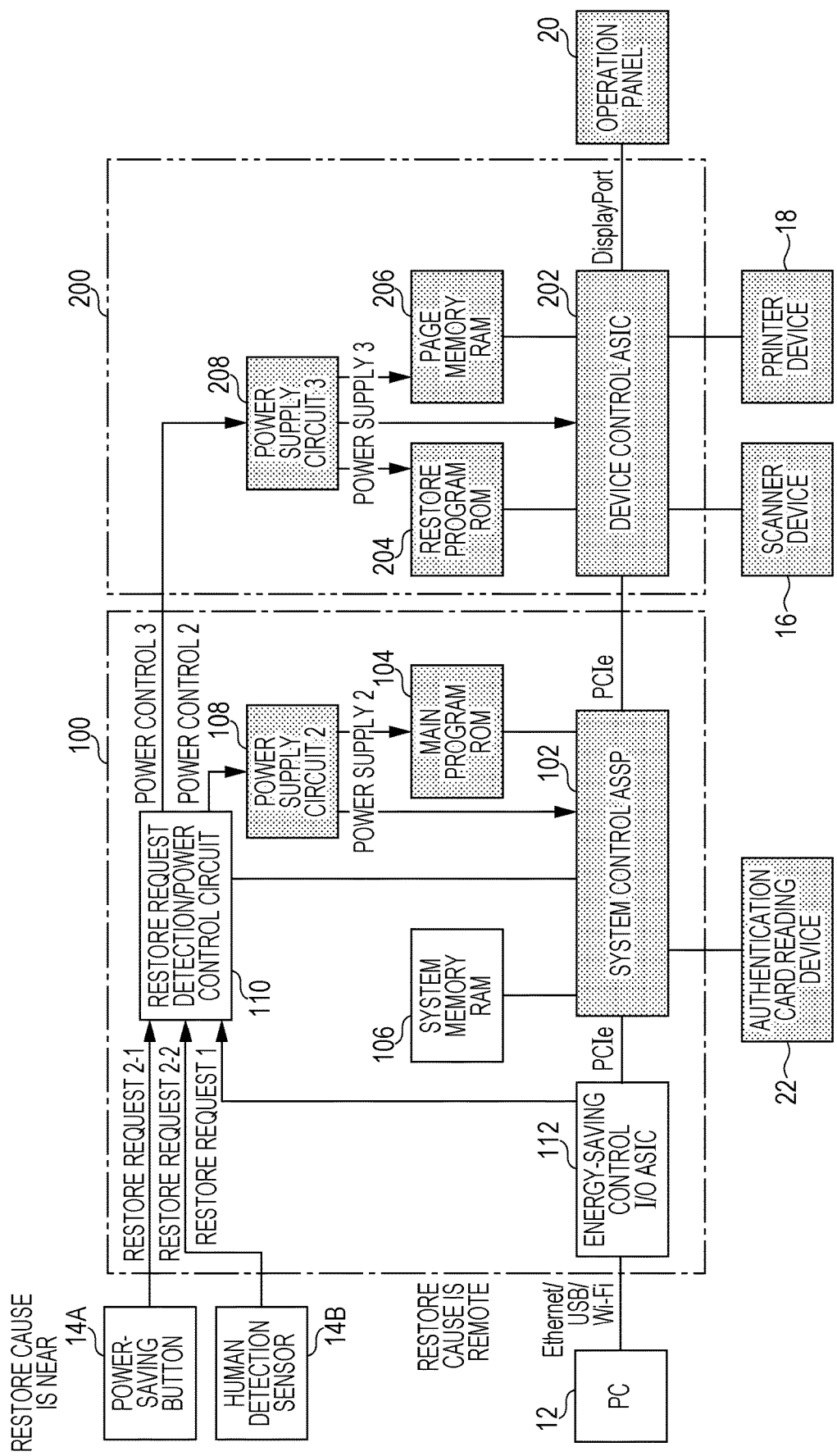
FIG. 4 is a block diagram of a multifunction printer of exemplary embodiment 2.

FIG. 4 depicts a block diagram of the MFP in the second exemplary embodiment. In the MFP in the first exemplary embodiment (see FIG. 1), the power-saving button 14 is connected to the restore request detection/power control circuit 110, whereas the second exemplary embodiment is different in that a power-saving button 14A and a human detection sensor 14B are connected to the restore request detection/power control circuit 110, as depicted in FIG. 4. In the second exemplary embodiment, the MFP is different in that an authentication card reading device 22 is connected to the MFP.

Next, the action of the second exemplary embodiment will be described.

A user who is in a location near the MFP (a proximate location) operates the power-saving button 14A. The human detection sensor 14B detects the presence of the user in a location that is further away than a proximate location but nearer the MFP than a remote location. Since the human detection sensor 14B detects the presence of the user in a location that is further away than a proximate location but nearer the MFP than a remote location in this way, when the user approaches the MFP to operate the power-saving button 14A, first, the human detection sensor 14B detects the user approaching the MFP, and, thereafter, the power-saving button 14A is operated.

The human detection sensor 14B, upon detecting the user, outputs a restore request 2-2 signal to the restore request detection/power control circuit 110.

When the power-saving button 14A is operated by the user, a restore request 2-1 signal is output to the restore request detection/power control circuit 110.

Figure 5:
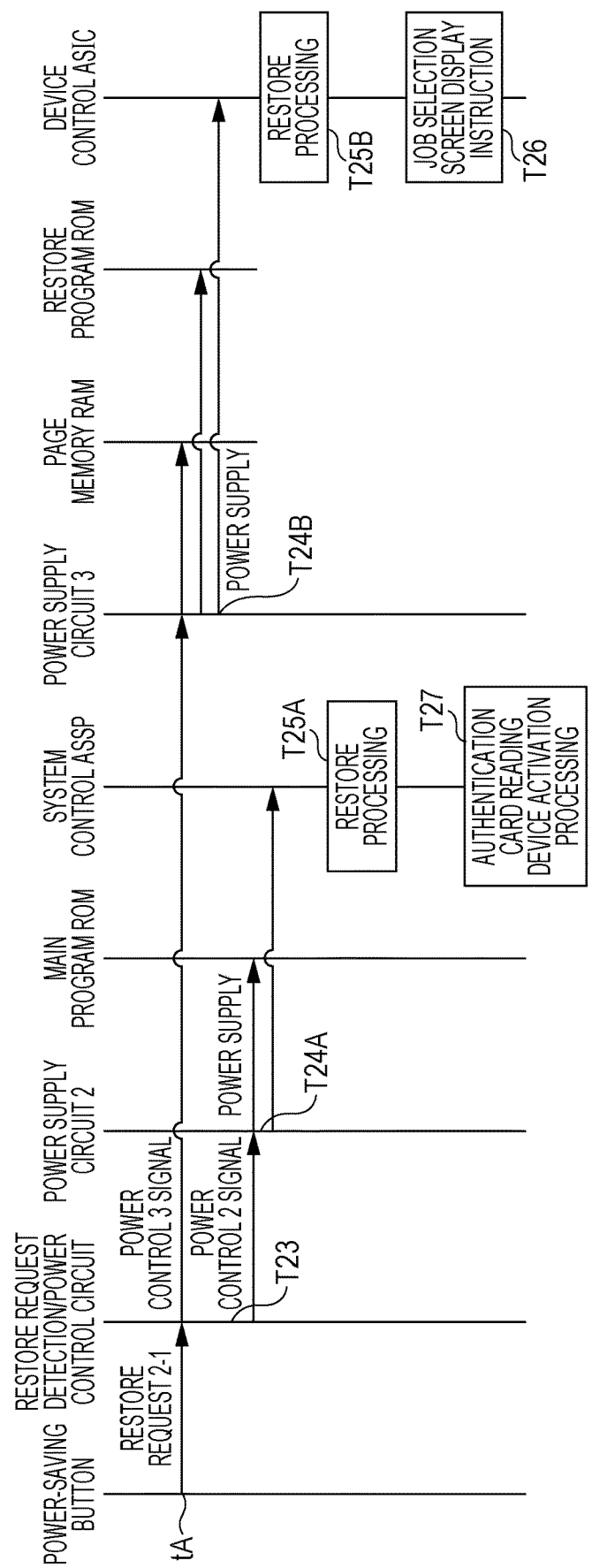
FIG. 5 is a timing chart for restore processing in a case where a restore request 2-1 signal is output to a restore request detection/power control circuit.

FIG. 5 depicts a timing chart for restore processing in a case where a restore request 2-1 signal is output to the restore request detection/power control circuit 110. The restore processing depicted in FIG. 5 has parts that are similar to the restore processing depicted in FIG. 3, and therefore descriptions of parts that are the same will be omitted, and parts that are different will be mainly described. In FIG. 3, the restore request 2 signal is output from the power-saving button 14 to the restore request detection/power control circuit 110 at time T22, and in FIG. 5, the restore request 2-1 signal is output from the power-saving button 14A to the restore request detection/power control circuit 110 at time tA. The processing after the restore request 2-1 signal has been output from the power-saving button 14A to the restore request detection/power control circuit 110 (see the part from time T23 to time T26 in FIG. 5) is similar to the processing after the restore request 2 signal has been output from the power-saving button 14 to the restore request detection/power control circuit 110 (see the part from time T23 to time T26 in FIG. 3).

In the processing in FIG. 5, after the restore processing (time T25A), the system control ASSP 102 supplies power from a power supply circuit that is not depicted, to the authentication card reading device which is thereby activated (time T27A).

FIG. 6 depicts a timing chart for restore processing in a case where a restore request 2-2 signal is output to the restore request detection/power control circuit 110. The restore processing depicted in FIG. 6 has parts that are similar to the restore processing depicted in FIG. 5, and therefore descriptions of parts that are the same will be omitted, and parts that are different will be mainly described.

The human detection sensor 14B, upon detecting the user, outputs a restore request 2-2 signal to the restore request detection/power control circuit 110 at time tB.

As described above, when the user approaches the MFP to operate the power-saving button 14A, first, the human detection sensor 14B detects the user approaching the MFP, and, thereafter, the power-saving button 14A is operated. Thus, in this case, time tB at which the human detection sensor 14B outputs the restore request 2-2 signal to the restore request detection/power control circuit 110 temporally precedes time to at which the restore request 2-1 signal is output from the power-saving button 14A, which has been operated, to the restore request detection/power control circuit 110.

It should be noted that the processing after the restore request 2-2 signal has been output from the human detection sensor 14B to the restore request detection/power control circuit 110 (see the part from time T33 to time T37 in FIG. 6) is similar to the processing after the restore request 2-1 signal has been output from the power-saving button 14A to the restore request detection/power control circuit 110 (see the part from time T23 to time T27 in FIG. 5).

Figure 3:
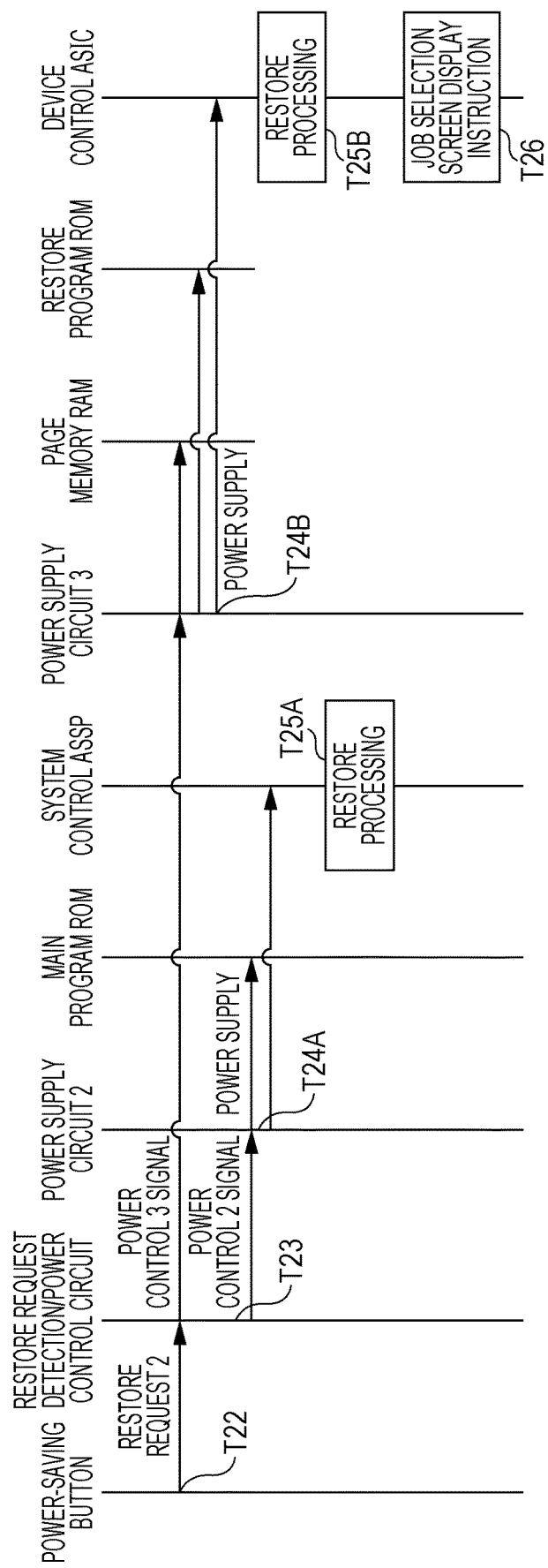
FIG. 3 is a timing chart for restore processing in a case where a restore request 2 signal is output to the restore request detection/power control circuit.

In the first exemplary embodiment, a case is assumed in which the authentication card reading device is connected to the MFP, a restore request 2 signal is output due to the power-saving button 14 being pressed, and the authentication card reading device is activated by way of the previously described processing (see the part from time T23 to time T26 in FIG. 3). In this case, the sequence of operations from the power-saving button 14 being pressed to the authentication card reading device being activated takes time, which is inconvenient in that the user is made to wait until the authentication completes.

In contrast, in the second exemplary embodiment, the human detection sensor 14B detects the user approaching the MFP in advance (time tB that precedes time tA), the restore request 2-2 signal is output, and the sequence of operations from the restore request 2-2 signal being output to the authentication card reading device being activated is executed. Thus, the user is not made to wait for a period of time until authentication card reading.

Incidentally, it is not necessary for the power control 3 signal to be output to the power supply circuit 3_208 at the same timing at which the restore request 2-2 signal is detected. The device control ASIC 202 may output the power control 3 signal to the power supply circuit 3_208 at a predetermined timing that takes into consideration the time to execute the sequence of loading the restore program from the restore program ROM 204, executing the restore processing, opening the page memory RAM, and starting the PCIe link training. That is, in a case where the restore request 2-2 signal is detected, the timing at which the power control 3 signal is output to the power supply circuit 3_208 is delayed by the time for the aforementioned sequence compared to the timing at which the power control 2 signal is output to the power supply circuit 2, and unnecessary power consumption is suppressed.

In addition, the configurations of the MFPs (FIGS. 1 and 4) described in the present exemplary embodiments are examples, and it goes without saying that unnecessary parts may be omitted and new parts may be added without deviating from the gist of the present disclosure.

Furthermore, the flow of the processing described in the aforementioned exemplary embodiments is also an example (see FIGS. 2, 3, 5, and 6), and unnecessary steps may be omitted, new steps may be added, and the processing order may be switched without deviating from the gist of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A control system comprising:
    a controller that controls a control unit of a control device, the control unit controlling a plurality of function units; and
    a restorer that configured to:
        receive a first instruction for restoration from an energy-saving mode from a user who is in a proximate location near the controller;
        receive a second instruction for the restoration from a user who is in a location further away than the proximate location,
        wherein a timing for restoration of the control unit in response to receipt of the first instruction from the user who is in the proximate location near the controller is different from a timing for restoration of the control unit in response to receipt of the second instruction from the user who is in the location further away than the proximate location; and
        cause the control unit and the controller to be restored in the case where the first instruction is received, and cause the controller to be restored in the case where the second instruction is received.

2. The control system according to claim 1,
wherein the timing for the restoration of the control unit in the case where the first instruction is received precedes the timing for the restoration of the control unit in the case where the second instruction is received.

3. The control system according to claim 2,
wherein it is possible for the second instruction to include an operation instruction that causes at least one of the plurality of function units to operate, and a processing instruction that instructs execution of predetermined processing without causing the function units to operate, and
after being restored, the controller determines whether the second instruction includes the operation instruction or the processing instruction,
when having determined that the second instruction includes the operation instruction, the controller instructs the control unit to be restored, and
when having determined that the second instruction includes the processing instruction, the controller executes the predetermined processing without instructing the restoration of the control unit.

4. The control system according to claim 3,
wherein the first instruction is carried out by an instruction unit that is connected to the control system and is operated by a user, and the second instruction is carried out due to instruction data that instructs the restoration being transmitted to the control system.

5. The control system according to claim 2,
wherein the first instruction is carried out by an instruction unit that is connected to the control system and is operated by a user, and
the second instruction is carried out due to instruction data that instructs the restoration being transmitted to the control system.

6. The control system according to claim 1,
wherein it is possible for the second instruction to include an operation instruction that causes at least one of the plurality of function units to operate, and a processing instruction that instructs execution of predetermined processing without causing the function units to operate, and
after being restored, the controller determines whether the second instruction includes the operation instruction or the processing instruction,
when having determined that the second instruction includes the operation instruction, the controller instructs the control unit to be restored, and
when having determined that the second instruction includes the processing instruction, the controller executes the predetermined processing without instructing the restoration of the control unit.

7. The control system according to claim 6,
wherein the first instruction is carried out by an instruction unit that is connected to the control system and is operated by a user, and
the second instruction is carried out due to instruction data that instructs the restoration being transmitted to the control system.

8. The control system according to claim 1,
wherein the first instruction is carried out by an instruction unit that is connected to the control system and is operated by a user, and
the second instruction is carried out due to instruction data that instructs the restoration being transmitted to the control system.

9. The control system according to claim 1,
wherein the control device is provided with a first storage unit that stores a first restoration program that causes the control unit to be restored,
the control system is provided with a second storage unit that stores a second restoration program that causes the controller to be restored,
the control unit executes restoration processing in accordance with the first restoration program stored in the first storage unit, and
the controller executes restoration processing in accordance with the second restoration program stored in the second storage unit.

10. The control system according to claim 1,
wherein, in a case where a detector that detects a user detects the user prior to the first instruction being received, the restorer causes the control unit and the controller to be restored.

11. The control system according to claim 10,
wherein, in the case where the detector detects the user prior to the first instruction being received, the restorer causes the controller to be restored, and thereafter causes the control unit to be restored.

12. A control system comprising:
a controller that controls a control unit of a control device, the control unit controlling a plurality of function units; and
a restorer that configured to:
receive, from a user who is in a proximate location near the controller, a first instruction for restoration from an energy-saving mode for at least one of the plurality of function units;
receive, from a user who is in a location further away than the proximate location, a second instruction for executing predetermined processing without causing the function units to operate,
wherein a timing for restoration of the control unit in response to receipt of the first instruction from the user who is in the proximate location near the controller is different from a timing for restoration of the control unit in response to receipt of the second instruction from the user who is in the location further away than the proximate location; and
cause the control unit and the controller to be restored in the case where the first instruction is received, and cause the controller to be restored in the case where the second instruction is received.

13. The control system according to claim 12,
wherein the timing for the restoration of the control unit in the case where the first instruction is received precedes the timing for the restoration of the control unit in the case where the second instruction is received.

14. A control system comprising:
control means for controlling a control unit of a control device, the control unit controlling a plurality of function units; and
restore means for:
receiving a first instruction for restoration from an energy-saving mode from a user who is in a proximate location near the controller;
receiving a second instruction for the restoration from a user who is in a location further away than the proximate location,
wherein a timing for restoration of the control means in response to receipt of the first instruction from the user who is in the proximate location near the controller is different from a timing for restoration of the control unit in response to receipt of the second instruction from the user who is in the location further away than the proximate location; and
causing the control unit and the controller to be restored in the case where the first instruction is received, and causing the controller to be restored in the case where the second instruction is received.

* * * * *